US010474750B1

(12) United States Patent
McCormick et al.

(10) Patent No.: US 10,474,750 B1
(45) Date of Patent: Nov. 12, 2019

(54) MULTIPLE INFORMATION CLASSES PARSING AND EXECUTION

(71) Applicant: Amazon Technologies, Inc., Seattle, WA (US)

(72) Inventors: Kevin Michael McCormick, Seattle, WA (US); David Anthony Leen, Seattle, WA (US); Christopher Wiswall Greene, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/453,391

(22) Filed: Mar. 8, 2017

(51) Int. Cl.
G06F 17/27 (2006.01)
G06F 17/22 (2006.01)
G06F 17/21 (2006.01)

(52) U.S. Cl.
CPC .......... *G06F 17/271* (2013.01); *G06F 17/214* (2013.01); *G06F 17/2247* (2013.01); *G06F 17/277* (2013.01)

(58) Field of Classification Search
CPC . G06F 8/33; G06F 15/16; G06F 17/30; G06F 3/048; G06F 8/34; G06F 17/2229; G06F 17/27; G06F 17/2775; G06F 17/30011; G06F 17/30973
See application file for complete search history.

(56) References Cited

U.S. PATENT DOCUMENTS

| 7,434,213 | B1 * | 10/2008 | Prakash | G06F 8/41 |
| | | | | 717/152 |
| 8,874,504 | B2 * | 10/2014 | King | G06F 17/30011 |
| | | | | 707/608 |
| 9,645,985 | B2 * | 5/2017 | Chen | G06F 17/24 |
| 9,659,084 | B1 * | 5/2017 | Zhang | G06F 17/30696 |
| 9,852,215 | B1 * | 12/2017 | Sullivan | G06F 17/30731 |
| 9,864,580 | B2 * | 1/2018 | Ben-Tzur | G06F 8/24 |
| 9,886,669 | B2 * | 2/2018 | Amershi | G06N 99/005 |
| 2009/0070328 | A1 * | 3/2009 | Loeser | G06F 17/30654 |
| 2009/0313604 | A1 * | 12/2009 | Miceli | G06F 8/423 |
| | | | | 717/120 |

(Continued)

OTHER PUBLICATIONS

Terence Parr; "What is ANTLR?"; http://web.archive.org/web/20170221054307/http:/www.anlir.org/; ANTLR; Feb. 2017; accessed Mar. 28, 2018; 3 pages.

(Continued)

*Primary Examiner* — Richemond Dorvil
*Assistant Examiner* — Mark Villena
(74) *Attorney, Agent, or Firm* — BakerHostetler

(57) ABSTRACT

Techniques for parsing and execution of data including multiple information classes are described herein. In some examples, a collection of data may include multiple information classes through which the data may be parsed and analyzed. In some examples, the multiple information classes may include a textual character information class, a visual style information class, and an inferred information class, such as may include data identifiable based on information external to the data collection. A plurality of tokens associated with the data collection may be generated. One or more of the plurality of tokens may be organized into a set of instructions. The set of instructions may be provided to a computer program for execution.

20 Claims, 11 Drawing Sheets

| Data Collection 350 | | | | | | | | | | | | | | | | | | | | | |
|---|---|---|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 | 17 | 18 | 19 | 20 | 21 |
| C | A | N | D | Y | | M | Y | | F | R | I | E | N | D | | B | U | R | G | E | R |

| Words 300 | 301 | 302 | 303 | 304 |
|---|---|---|---|---|
| Bold 310 | 311 | | | |
| Italic 320 | | 321 | | |
| Underline 330 | | | 331 | |
| Food 340 | | | | 341 |

(56) References Cited

U.S. PATENT DOCUMENTS

| | | | | |
|---|---|---|---|---|
| 2013/0067319 | A1* | 3/2013 | Olszewski | G06F 17/218 715/234 |
| 2013/0159340 | A1* | 6/2013 | Blanco | G06F 17/30867 707/769 |
| 2014/0278370 | A1* | 9/2014 | Chen | G06F 17/24 704/9 |
| 2014/0359585 | A1* | 12/2014 | Marvie | G06F 8/41 717/139 |
| 2015/0089615 | A1* | 3/2015 | Krawczyk | G06F 21/31 726/7 |
| 2015/0199329 | A1* | 7/2015 | Kim | G06F 17/27 715/254 |
| 2015/0242761 | A1* | 8/2015 | Amershi | G06N 99/005 706/11 |
| 2015/0317610 | A1* | 11/2015 | Rao | G06Q 10/1053 705/321 |
| 2015/0356198 | A1* | 12/2015 | D'Souza | G06F 17/30914 705/2 |
| 2016/0034425 | A1* | 2/2016 | Liu | G06F 17/30056 715/202 |
| 2016/0162466 | A1* | 6/2016 | Munro | G06F 17/277 704/9 |
| 2017/0017978 | A1* | 1/2017 | Wallace | G06Q 30/0207 |
| 2017/0090892 | A1* | 3/2017 | Gass | G06F 8/51 |
| 2017/0115961 | A1* | 4/2017 | Ben-Tzur | G06F 8/24 |
| 2017/0116109 | A1* | 4/2017 | Perez Acosta | G06F 8/42 |
| 2017/0147324 | A1* | 5/2017 | Weber | G06F 8/65 |

OTHER PUBLICATIONS

"The Lex & Yacc Page"; http://web.archive.org/web/20170221010449/http:/dinosaur.compiletools.net;/ Feb. 2017; accessed Mar. 28, 2018; 4 pages.

"YAML"; http://web.archive.org/web/20170225060613/https:/en.wikipedia.orh/wiki/YAML; Wikipedia; Feb. 2017; accessed Mar. 28, 2018; 10 pages.

"JSON"; http://web.archive.org/web/20170306125827/https://en.wikipedia.org/wiki/JSON; Wikipedia; Mar. 6, 2017; accessed Mar. 28, 2018; 16 pages.

"XML"; http://web.archive.org/web/20170305085317/https://en.wikipedia.org/wiki/XML; Wikipedia; Mar. 5, 2017; accessed Mar. 28, 2018; 18 pages.

"Backus—Naur form"; http://web.archive.org/wiki/Backus%E2%80%93Naur_form; Feb. 2017; accessed Mar. 28, 2018; 9 pages.

* cited by examiner

Table 400

| Span ID 401 | Parent 402 | Escape Range 403 | Re-entry Range 404 |
|---|---|---|---|
| 301 | null | 0 | 4 |
| 302 | null | 6 | 7 |
| 303 | null | 9 | 14 |
| 304 | null | 16 | 21 |
| 311 | words | 0-4 | 0-4 |
| 321 | words | 0-21 | 0-21 |
| 331 | words | 9-21 | 9-21 |
| 341 | words | 16 | 16 |

FIG. 4

| First result of *curr(s)* |
|---|
| {<br>    500: { type: 'word', start: 0, end: 4 },<br>    501: { type: 'bold', start: 0, end: 4 },<br>    502: { type: 'italic', start: 0, end: 21 },<br>    503: { type: 'bold+italic', start: 0, end: 4 },<br>    504: { type: 'word+italic', start: 0, end: 4 },<br>    505: { type: 'word+bold+italic', start: 0, end: 4 }<br>}    510 |

| | Results of *advavce(t)* for tokens 500-505 |
|---|---|
| 500 | [<br>  { type: 'word', start: 6, end: 7 },<br>  { type: 'italic', start: 6, end: 21 },<br>  { type: 'word+italic', start: 6, end: 7 }<br>]   520 |
| 501 | [<br>  { type: 'word', start: 6, end: 7 },<br>  { type: 'italic', start: 6, end: 21 },<br>  { type: 'word+italic', start: 6, end: 7 }<br>]   521 |
| 502 | [ ]   522 |
| 503 | [<br>  { type: 'word', start: 6, end: 7 },<br>  { type: 'italic', start: 6, end: 21 },<br>  { type: 'word+italic', start: 6, end: 7 }<br>]   523 |
| 504 | [<br>  { type: 'word', start: 6, end: 7 },<br>  { type: 'italic', start: 6, end: 21 },<br>  { type: 'word+italic', start: 6, end: 7 }<br>]   524 |
| 505 | [<br>  { type: 'word', start: 6, end: 7 },<br>  { type: 'italic', start: 6, end: 21 },<br>  { type: 'word+italic', start: 6, end: 7 }<br>]   525 |

FIG. 5

| Second result of *curr(s)* |
|---|
| {     700: { type: 'word', start: 6, end: 8 },<br>   701: { type: 'italic', start: 6, end: 21 },<br>   702: { type: 'word+italic', start: 6, end: 8 },<br>   703: { type: 'X_Recognized_Date', start: 6, end: 15 },<br>   704: { type: 'X_Recognized_Date+italic', start: 6, end: 15 }<br>}                                                                                                            710 |

| | Results of *advavce(t)* for tokens 700-704 |
|---|---|
| 700 | [<br>  { type: 'word', start: 10, end: 10 },<br>  { type: 'italic', start: 10, end: 21 },<br>  { type: 'word+italic', start: 10, end: 10 },<br>]     720 |
| 701 | [ ]     721 |
| 702 | [<br>  { type: 'word', start: 10, end: 10 },<br>  { type: 'italic', start: 10, end: 21 },<br>  { type: 'word+italic', start: 10, end: 10 },<br>]     722 |
| 703 | [<br>  { type: 'word', start: 17, end: 21 },<br>  { type: 'italic', start: 17, end: 21 },<br>  { type: 'word+italic', start: 17, end: 21 },<br>]     723 |
| 704 | [<br>  { type: 'word', start: 17, end: 21 },<br>  { type: 'italic', start: 17, end: 21 },<br>  { type: 'word+italic', start: 17, end: 23 },<br>]     724 |

FIG. 7

Data Organization Rules 810 (example)

Definition Rules 811

```
LETTER       ::= 'a' | 'b' | 'c' | ...
<[text]word> ::= LETTER | LETTER <word>
<stub>       ::= <[text]word+[bold]span> <[date]date> <[text]word>
<flub>       ::= <[text]word+[bold]span> <[date]date> <[date]date> <[text]word>
```

Glue Rules 812

```
<block>    ::= (<sentence> | <flub> | <stub>) | NEWLINE
<sentence> ::= <word>+
```

FIG. 8

MULTIPLE INFORMATION CLASSES PARSING AND EXECUTION

BACKGROUND

A computer program listing may be composed by a programmer as a single linear stream of plain text characters. The text input stream may be converted into tokens in a process referred to lexical analysis. In simple terms, each span of text may be given a single tag that describes the nature of the span, which becomes a fundamental building block in future stages. Through a process referred to as parsing, tokens may be converted into nodes of a parse tree. Tokens that are used by the parser often are represented as terminal nodes in the parse tree. Nodes in the parse tree that are generally not just tokens may be referred to as non-terminals. An abstract syntax tree is a more refined data structure that has enhanced semantic meaning. An abstract syntax tree may assist in enabling semantic analysis, compilation to machine code, transpilation, and other related processes. Formal grammars may be employed to aid in generating code for converting from text, to token, to parse tree, to abstract syntax tree.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 4 is a diagram illustrating example multiple information class span attributes that may be used in accordance with the present disclosure.

FIG. 5 is a diagram illustrating first example multiple information class parsing instructions and results that may be used in accordance with the present disclosure.

FIG. 7 is a diagram illustrating second example multiple information class parsing instructions and results that may be used in accordance with the present disclosure.

FIG. 8 is a diagram illustrating example data organization rules that may be used in accordance with the present disclosure.

DETAILED DESCRIPTION

Figure 1:
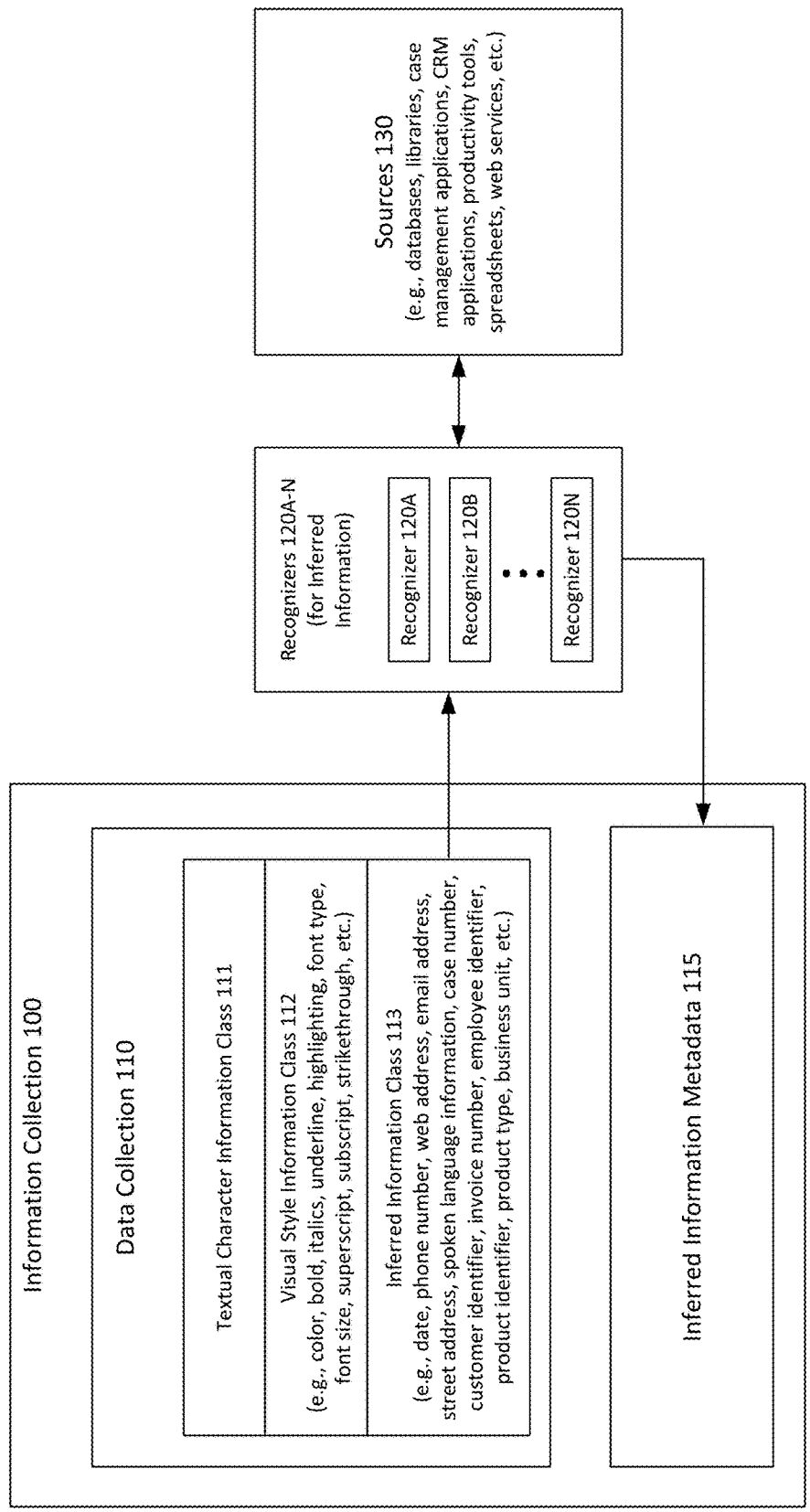
FIG. 1 is a diagram illustrating an example data collection with multiple information classes that may be used in accordance with the present disclosure.

Techniques for parsing and execution of data including multiple information classes are described herein. In some examples, a collection of data may be generated, such as for execution by one or more computer programs. The collection of data may include multiple information classes through which the data may be parsed and analyzed. In some examples, the multiple information classes may include a textual character information class. The textual character information class may include indications of one or more textual characters (e.g., letters, numbers, character symbols, punctuation, etc.) in the data collection, for example similar to plain text characters such as may traditionally be employed in computer program listings. Additionally, in some examples, the multiple information classes may include a visual style information class, for example including information types such as color, bold, italics, underlining, highlighting, font type, font size, superscript, subscript, strikethrough, and others. Additionally, in some examples, the multiple information classes may include an inferred information class, such as may include data identifiable based on information external to the data collection. In some examples, the inferred information class may include information types such as date, phone number, web address, email address, street address, spoken language information (e.g., sentence, subject, object, verb, etc.), case number, customer identifier, invoice number, employee identifier, product identifier, product type, business unit, and others.

In some examples, a data collection may be analyzed by one or more information recognizer components to identify any inferred information types that may be included within the data collection. For example, a date recognizer may be employed to analyze the data collection and identify any dates included within the data collection. Dates may be expressed using many varieties of different formats, such as numeric formats (e.g., 01/02/2017, etc.), letter-and-numeric formats (Jan. 2, 2017, etc.), date-first formats, month-first formats, date-and-month formats, month-and-year formats, date-month-and-year formats, and any combinations of these and other formats. In some examples, a date recognizer may employ a respective date library that identifies or indicates these and other date formats. Other recognizers may also be employed for other types of inferred information, such as times, phone numbers, email addresses, web addresses, street addresses, and the like. Additionally, in some examples, recognizers may employed to identify information types used in various external data sources, such as databases, case management applications, customer relationship management (CRM) applications, productivity tools, spreadsheets, web services, and others. In some cases, indications of data corresponding to these identified information types may be included in metadata that is generated by the one or more recognizers and associated with the data collection being analyzed.

A data collection and any associated metadata may then be provided to one or more lexical analyzer (e.g., tokenizer) and parser components, for example for token generation, parsing and organization into computing instructions. A "token", as used herein, may refer to a portion of data that is identifiable based on one or more criteria. In some examples, the lexical analyzer may analyze the data collection and the associated metadata to generate a plurality of tokens associated with the data collection. In some cases, the plurality of tokens may correspond to multiple different classes of information included within the data collection. For example, some tokens may correspond to the textual character information class, while other tokens may correspond to the visual style information class, and yet other tokens may correspond to the inferred information class. In some examples, one or more generated tokens may have parent-child or other relationships with respect to one or more other generated tokens. For example, in some cases, if a particular word is formatted in bold text, a word token corresponding to the word may be considered a parent token, while the a bold token corresponding to the characters of the word may be considered to be a child of the parent word token.

In some examples, a set of rules may be provided that enable the plurality of tokens to be generated and organized into a set of computing instructions. The set of rules may be accessible to the parser, which may employ the set of rules in order to provide instructions to the lexical analyzer for generation of the tokens. For example, in some cases, the parser may instruct the lexical analyzer to generate a first set of tokens for a first portion of the data collection. The first set of tokens may include multiple tokens associated with multiple different information classes and/or types. The parser may then evaluate the first set of tokens and select, based at least in part on the set of rules, a particular token for association with a set of instructions. The parser may then provide instructions to the lexical analyzer to generate, based at least in part on the particular selected token, the next set of tokens. This process may be repeated any number of times, such as to select multiple tokens from multiple generated sets of tokens. In some examples, the parser may then organize, based at least in part on the set of rules, the selected tokens into a set of computing instructions. The set of computing instructions may then be provided to one or more computer programs for execution.

The ability to parse a data collection including multiple information classes may provide a number of advantages, for example as compared to other computer program listings or data collections that may include only plain text data. For example, as will be described in detail below, the use of multiple information classes may, in some cases, allow data to be expressed in a more concise format that is more natural and intuitive to humans. For example, the multiple information classes may correspond to formats that are used by humans in spoken and/or written communication as well as formats that are used to organize data for business, entertainment, sales, human resources, education, and other areas. Additionally, in some examples, the multiple information classes may allow leveraging of information external to the data collection itself, such as external databases, libraries, applications, services, machine learning resources, and other information sources. In some examples, this may allow compactly and precisely communicating intent to a computer program, without explicitly providing all of the context necessary to complete the task. Furthermore, in some cases, the use of multiple information classes may allow attributes of a data collection to be easily discovered, such as a respective type of data collection (e.g., computer program listing, invoice, email or letter, etc.) and its intended recipients and use. In some examples, personal automation scripts may be created by using a combination of textual instructions, visual formatting, diagrams, and other types of information. Also, in some examples, complex, nested, and/or highly interconnected data structures may be described, for example by using bulleted lists, tables, and other data types.

FIG. 1 is a diagram illustrating an example data collection 110 with multiple information classes that may be used in accordance with the present disclosure. In some examples, data collection 110 may include data associated with a computer program, such a computer program listing, an invoice, an email, a letter, or other types of data collections. In the example of FIG. 1, data collection 110 includes data associated with multiple information classes, including textual character information class 111, visual style information class 112, and inferred information class 113. It is noted that information classes 111, 112, and 113 are merely examples of various information classes that may be included in a data collection 110. In some examples, data collection 110 may not include one or more of information classes 111, 112, 113. Additionally, in some examples, data collection 110 may include any number of additional or alternative information classes. Furthermore, in some examples, data collection 110 may include information classes that are combinations of information classes 111, 112, and/or 113, such as may include combinations of information types from two or more of information classes 111, 112, 113 and/or other information classes. The textual character information class 111 may include indications of one or more textual characters (e.g., letters, numbers, character symbols, punctuation, etc.) in the data collection 110, for example similar to plain text characters such as may traditionally be employed in computer program listings. By contrast, visual style information class 112 may include visual style information associated with one or more characters, such as color, bold, italics, underlining, highlighting, font type, font size, superscript, subscript, strikethrough, and others.

Additionally, inferred information class 113 may include information types that may be identifiable based on information external to the data collection 110. In some examples, the inferred information class 113 may include information types such as date, phone number, web address, email address, street address, spoken language information (e.g., sentence, subject, object, verb, etc.), case number, customer identifier, invoice number, employee identifier, product identifier, product type, business unit, and others. In the example of FIG. 1, the data collection 110 is analyzed by recognizers 120A-N, which, as described below, may identify one or more inferred information types within the data collection 110. In particular, recognizers 120A-N may use information provided by sources 130 in order to determine various formats for inferred information. Recognizers 120A-N may scan data collection 110 to find information that matches or is otherwise associated with information formats provided by sources 130.

Sources 130 may include a wide variety of information sources, such as databases, case management applications, customer relationship management (CRM) applications, productivity tools, spreadsheets, web services, and others. In some examples, one or more of sources 130 may specialize in providing information regarding a particular type of information. For example, certain libraries may specialize in providing information regarding date formats, while other libraries may specialize in providing information regarding phone number formats. Similarly, in some examples, one or more of recognizers 120A-N may be specialized to focus on a particular inferred information type. For example, one of recognizers 120A-N may specialize in recognizing date formats, while another of recognizers 120A-N may specialize in recognizing phone number formats. In some examples, one or more of recognizers 120A-N may be specifically configured to interact with one or more respective sources 130, such as to communicate, formulate queries, or otherwise retrieve appropriate information and formats.

In some examples, a particular type of inferred information may have several related data formats. For example, as set forth above, dates may be expressed using many varieties of different formats, such as numeric formats (e.g., 01/02/2017, etc.), letter-and-numeric formats (Jan. 2, 2017, etc.), date-first formats, month-first formats, date-and-month formats, month-and-year formats, date-month-and-year formats, and any combinations of these and other formats. In some cases, it may be unclear whether particular characters or portions of a data collection correspond to a particular inferred information type. For example, in many cases, the word "April" may correspond to a month and/or date. As should be appreciated, however, the word "April" may also be used in other contexts, such as in a name, address, and the like. Accordingly, in some examples, recognizers 120A-N may determine a confidence value that represents an amount of confidence that a particular data span corresponds to a particular related information type.

In some examples, upon recognizing a span of data within data collection 110 associated with a particular type of inferred information, recognizers 120A-N may generate inferred information metadata 115 associated with the data span. In some examples, metadata 115 may include information that may be usable to generate a token associated with the data span, such as an inferred information type (e.g., date, phone number, address, etc.), an indication of the characters included within the data span, an indication of a position or location of the data span within the data collection 110 (e.g., one or more offset values), a confidence value that the data span corresponds to the indicated information type, and other associated information. In one specific example, a recognizer 120A-N may recognize portions of text as being a valid English language sentence and may store may metadata 115 indicating elements of the sentence, such as a subject, object, verb, etc. In some examples, metadata 115 may also include information provided by a human. For example, in some cases, a human may analyze the data collection 110 and may provide metadata 115 indicating that a particular span of text within the data collection 110 corresponds to a particular information type.

Additionally, in some examples, metadata 115 may include information indicating a data collection type (e.g., computer program listing, invoice, email or letter, etc.) associated with data collection 110. For example, in some cases, upon detecting an invoice number, date, product number, and address, recognizers 120A-N may determine that data collection 110 is an invoice and may indicate this within metadata 115. Such an indication may be used in a number of ways, for example to determine an appropriate set of rules for tokenizing and parsing of the data collection 110, to determine appropriate recipients for the data collection 110, to determine an appropriate computer program or platform for execution of the data collection 110 and instructions associated therewith, and for many other reasons.

In some examples, recognizers 120A-N and/or sources 130 may employ various machine learning techniques, such as to determine and refine information types and associated formats. For example, a particular company may have an invoice identifier that includes a country code (e.g., US for United States) followed by an eight digit number. In one example scenario, the company may do most of its business in the United States, and employees of the company may sometimes omit the country code US when referring to US invoices. In some examples, recognizers 120A-N may employ machine learning techniques to determine that an eight digit number without a specified country code is intended to refer to an invoice identifier for an invoice associated with the United States. For example, in some cases, recognizers 120A-N may determine that eight digit numbers without a country code tend to commonly appear in invoices having addresses in the United States. Based on this information, the recognizers 120A-N may begin to associate eight digit numbers having no country code with the United States, such as by gradually raising the confidence value for this association over time as more such associations are identified. As another example, a recognizer 120A-N may identify an eight digit number and may request feedback from a human user, such as an author of the data collection 110. For example, a recognizer 120A-N may generate an error message that reads, "I see that there is an eight digit number in this document with no associated country code." The error message may further request, "please provide a country code" or "did you intend this number to be associated with a US country code?" or another similar request.

Figure 2:
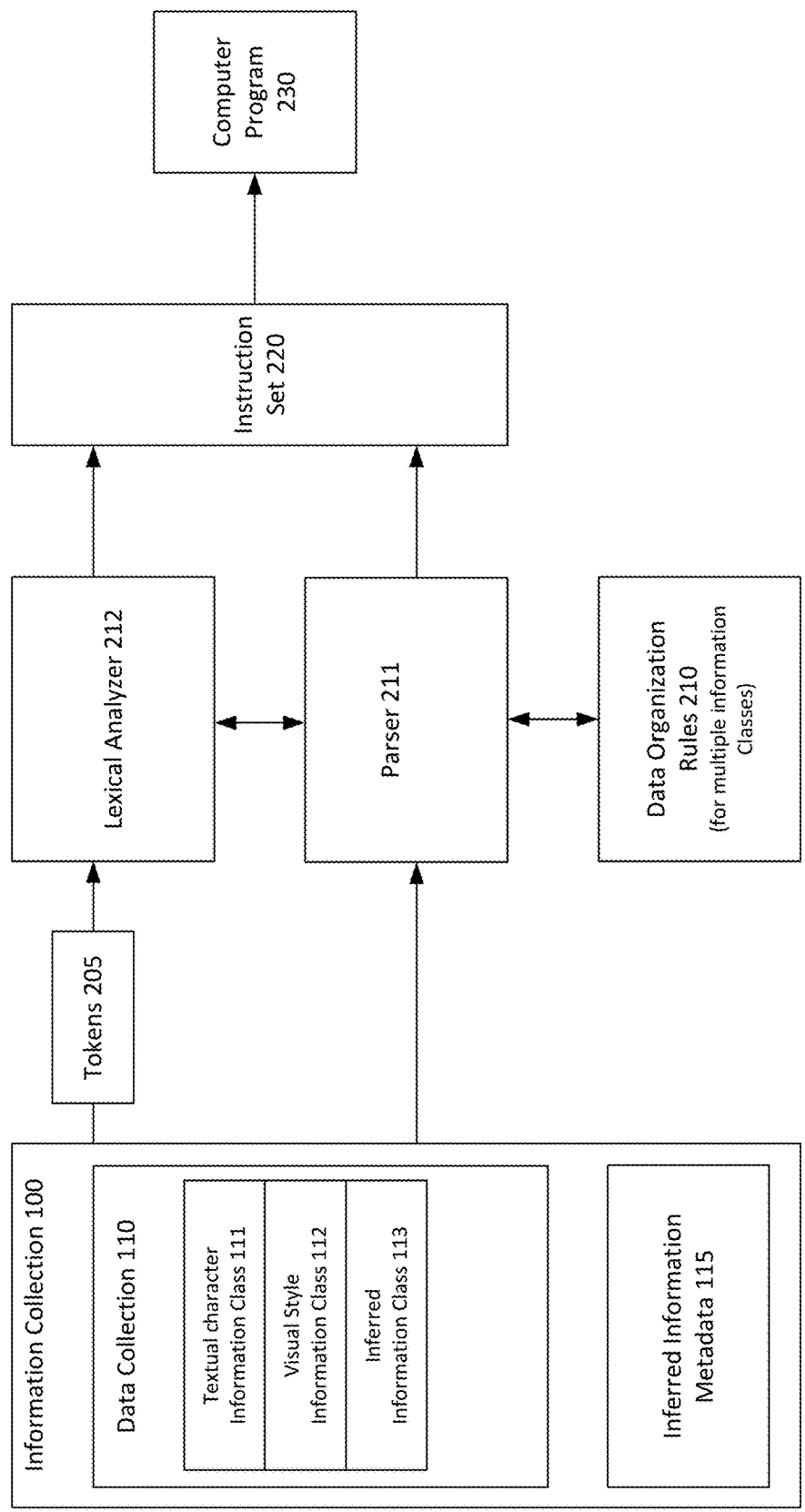
FIG. 2 is diagram illustrating an example multiple information class parsing and execution system that may be used in accordance with the present disclosure.

As shown in FIG. 1, the inferred information metadata 115 may be included in an information collection 100 associated with the data collection 110. In some examples, the information collection 100 may then be provided to one or more components for tokenizing and parsing of the data collection 110. Referring now to FIG. 2, it is seen that information collection 100, including computer program 110 and metadata 115, may be analyzed by a lexical analyzer 212 in order to generate tokens 205. In some examples, as will be described in detail below, lexical analyzer 212 may generate tokens 205 based on instructions from a parser 211. Parser 211 may generate and provide instructions to lexical analyzer 212, such as for token generation, based on a set of data organization rules 210. In some examples, parser 211 may be a top-down parser, such as a simple recursive-descent parser, or another type of parser. In general, rules 210 may include rules for organization of data including multiple information classes, such as classes 111, 112 and 113. In some examples, the data organization rules 210 may include rules that define one or more valid combinations of tokens, such as valid combinations of tokens from different information classes and/or types. Also, in some examples, there may be a number of different rule sets available for different types of data collections. For example, in some cases, certain rule sets may apply to computer program listings, while other rule sets may apply to invoices, emails, letters, or other types of data collections. In some examples, parser 211 may use information in metadata 115 to determine a particular data collection type associated with data collection 110 and to determine one or more particular rule sets applicable to the data collection 110.

Figure 3:
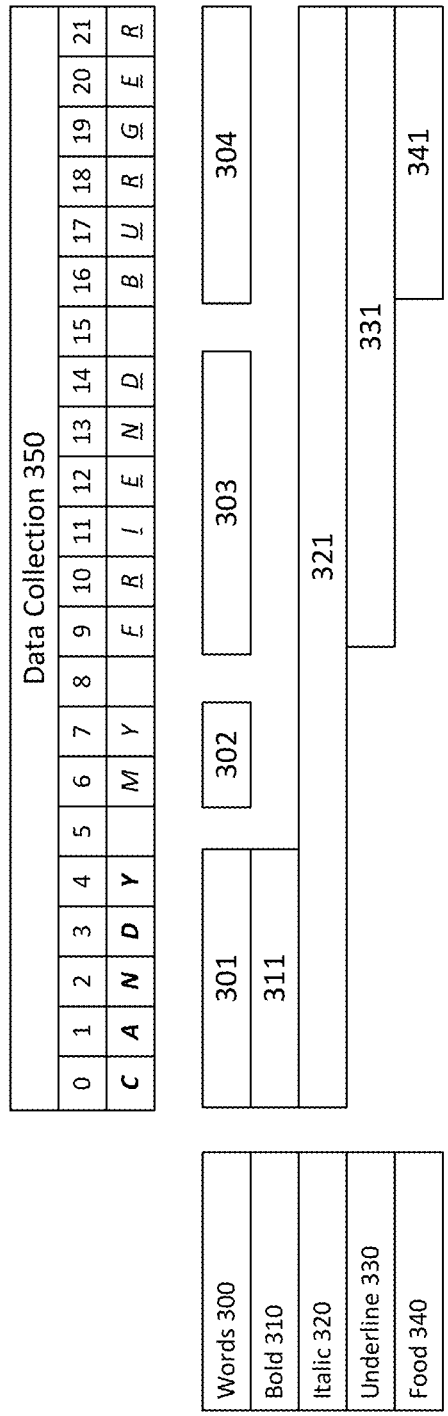
FIG. 3 is diagram illustrating first example multiple information class spans within a data collection that may be used in accordance with the present disclosure.

Thus, as set forth above, lexical analyzer 212 may generate tokens 205 associated with data collection 110. Some example techniques for generation of tokens 205 for a data collection including multiple information classes will now be described in detail. In particular, referring now to FIG. 3, an example data collection 350 is shown that includes the data "CANDY MY FRIEND BURGER". As shown in FIG. 3, offsets 0-21 are shown for indicating ranges of various data spans within data collection 350. As also shown in FIG. 3, the data within collection 350 corresponds to a number of information types including words 300, bold 310, italic 320, underline 330, and food 340. Specifically, words 300 are textual character information types categorized within textual character information class 111. Additionally, bold 310, italic 320, and underline 330 are visual style information types categorized within visual style information class 112. Furthermore, food 340 is an inferred information type categorized within inferred information class 113. In some examples, information types 300, 310, 320 and 330 may be identifiable based strictly on information within the data collection 350 (e.g., textual characters, visual style formatting, etc.). By contrast, in some examples, food 340 is an information type that may be recognized based on information external to data collection 110, such as information in one or more sources 130 of FIG. 1 that categorize a burger as a type of food. In some examples, metadata 115 of FIGS. 1 and 2 may include information, such as may be provided by recognizers 120A-N of FIG. 1, indicating that range 16-21 in data collection 350 (i.e., the data span associated with the word BURGER) corresponds to a particular instance of the food information type.

As also shown in FIG. 3, it is seen that the words information type 300 has four associated spans 301-304 within data collection 350. In particular, span 301 includes the word CANDY from range 0-4, span 302 includes the word MY from range 6-7, span 303 includes the word FRIEND from range 9-14, and span 304 includes the word BURGER from range 16-21. Additionally, it is seen that the bold information type 310 has one associated span 311 within data collection 350. In particular, span 311 includes the bolded text associated with the word CANDY from range 0-4. Additionally, it is seen that the italic information type 320 has one associated span 321 within data collection 350. In particular, span 321 includes the italicized text associated with the words CANDY MY FRIEND BURGER from range 0-21. Additionally, it is seen that the underline information type 330 has one associated span 331 within data collection 350. In particular, span 331 includes the underlined text FRIEND BURGER from range 9-21. Additionally, it is seen that the food information type 340 has one associated span 341 within data collection 350. In particular, span 341 includes the text associated with the word BURGER from range 16-21.

In some examples, lexical analyzer 212 may analyze data collection 110 to determine various attributes associated data spans such as those shown in FIG. 3. Referring now to FIG. 4, an example table 400 is shown that depicts some of the attribute information for data spans that may be collected by lexical analyzer 212 and/or other components. In particular, as shown in FIG. 4, table 400 includes various columns 401-404 that include information corresponding to each of spans 301-304, 311, 321, 331 and 341 of FIG. 3. Specifically, Span identifier (ID) column 401 includes an identifier for each respective span. Parent column 402 indicates a type of parent span (if any) for each respective span. For example, spans 301-304 are word spans that do not have any associated parent span. Thus, column 402 includes a null value for each of spans 301-304. By contrast, spans 311-341 each have respective parent spans that correspond to the words information type 300. In particular, span 311 includes bold text corresponding to the parent word CANDY, span 321 includes italicized text corresponding to the parent words CANDY MY FRIEND BURGER, span 331 includes underlined text corresponding to the parent words FRIEND BURGER, and span 341 includes bold text corresponding to the parent word BURGER.

Escape range column 403 identifies an escape range for each respective span, which is a range of one or more offsets (e.g., in a parent span) that permissibly lead into a token associated with the data portion/span. Specifically, the escape range for each of word spans 301-304 includes the offset of the first character in the respective word span. Additionally, the escape range for food span 341 includes the offset of the first character in the parent word span BURGER. By contrast, the escape range for each of spans 311, 321, and 331 includes the offsets for the entire range occupied by the respective span. For example, while the word CANDY is bold, it is also valid to consider a portion of that word, such as the letters ANDY, to be bold. However, while letters ANDY may be considered bold, the letters ANDY do not constitute a valid word. As another example, while the word BURGER is underlined, it is also valid to consider a portion of that word, such as the letters URGER, to be underlined. However, while the word BURGER may be considered a food, the letters URGER do not constitute a valid food.

Re-entry range column 404 identifies a re-entry range for each respective span, which is a range of one or more offsets (e.g., in a parent span) that a token associated with the data portion/span permissibly exits into. Specifically, the re-entry range for each of word spans 301-304 includes the offset of the last character in the respective word span. Additionally, the re-entry range for food span 341 includes the offset of the last character in the parent word span BURGER. By contrast, the re-entry range for each of spans 311, 321, and 331 includes the offsets for the entire range occupied by the respective span. For example, if a token corresponding to span 341 (the food BURGER) is consumed by the parser 211, then the parser will not return and interpret the word BURGER. As will be described in detail below, the escape and re-entry ranges may be used, for example, to determine which spans can be considered applicable at any given point in the parsing process.

As set forth above, in some examples, lexical analyzer 212 may generate tokens 205 associated with a data collection 110 based on instructions provided by parser 211. In some conventional single information class (e.g., plain text) parsing techniques, a parser may provide instructions to analyze a current token corresponding to a current analyzed portion of a data collection (e.g., a curr( ) instruction) and instructions to advance to a next token corresponding to a next portion of the data collection (e.g., an advance( ) instruction). However, while these instructions may be suitable for parsing of single information class (e.g., plain text) data collections, they may be inefficient and/or unsuitable for parsing of a multiple information class data collection. One reason for this is that, for a given portion of a multiple information class data collection, there may exist multiple current tokens corresponding to multiple information classes and/or types.

In some examples, when parsing a data collection with multiple information classes and/or types such as described herein, the parser 211 may issue a call that requests generation of a set of one or more current tokens. In particular, the set of current tokens may include a token for each information type associated with a current analyzed portion of the data collection, such as a current analyzed offset. In some cases, if multiple different information types have tokens associated with a current analyzed portion of the data collection, then this set may include multiple current tokens. This call is referred to hereinafter using the notation curr(s), in which the (s) represents that the call may return a set (s) of current tokens that may, in some cases, include multiple current tokens.

Additionally, in some examples, when parsing a data collection with multiple information classes and/or types such as described herein, the parser 211 may select one or more current tokens within the current token set and issue a call requesting advancement to a next token set corresponding to the one or more selected tokens. This call is referred to hereinafter using the notation advance(t), in which the (t) represents that the call advances to a next token set for one or more particular selected tokens (t) in the current token set.

Referring now to FIG. 5, some examples of the curr(s) and advance(t) instructions referred to above will now be described in detail. As shown in FIG. 5, results box 510 includes example results for a first call to the curr(s) instruction for data collection 350 of FIG. 3 including the data "CANDY MY FRIEND BURGER". The first call to the curr(s) instruction may be associated with the start (e.g., an offset of 0) of the data collection 350 and may, therefore, return a set of current tokens for each information type associated with start of the data collection 350. Specifically, as shown in box 510, the first call to the curr(s) instruction returns a set of six tokens 500-505. In particular, token 500 is associated with the word information type (i.e., the word CANDY), token 501 is associated with the bold information type (i.e., the bold text CANDY), token 502 is associated with the italic information type (i.e., the italic text CANDY MY FRIEND BURGER), token 503 is associated with the bold+italic information type (i.e., the bold and italic text CANDY), token 504 is associated with the word+italic information type (i.e., the italic word CANDY), and token 505 is associated with the word+bold+italic information type (i.e., the bold italic word CANDY).

Thus, tokens 500-505 may represent a set of current tokens returned by the first call to the curr(s) instruction. As set forth above, in some examples, the parser may select, for example based on data organization rules 210, a token from set of current tokens (e.g., one of tokens 500-505) and issue an advance(t) call requesting advancement to a next token set corresponding to the selected current token. As also shown in FIG. 5, result boxes 520-525 show example results for an advance(t) call for each of tokens 500-505. In particular, result box 520 shows results for an advance(t) call based on selection of token 500, result box 521 shows results for an advance(t) call based on selection of token 501, result box 522 shows results for an advance(t) call based on selection of token 502, result box 523 shows results for an advance(t) call based on selection of token 503, result box 524 shows results for an advance(t) call based on selection of token 504, and result box 525 shows results for an advance(t) call based on selection of token 505. As can be seen in FIG. 5, for each of tokens 500, 501, 503, 504 and 505, the respective result boxes 520, 521, 523, 524 and 525 are identical to one another. This is because, as shown in results box 510, each of tokens 500, 501, 503, 504 and 505 ends at the same offset (i.e., offset 4) as one another. By contrast, for token 502, the results box 522 includes no results. This is because, as shown in results box 510, token 502 ends at offset 21, which is the end of data collection 350. As also shown in FIG. 5, result boxes 520, 521, 523, 524 and 525 each include three tokens for each information type in data collection 350 having a token that may be permissibly started at offset 6. This is because offset 6 is the next offset that includes text subsequent to the end of tokens 500, 501, 503, 504 and 505 at offset 4.

Figure 6:
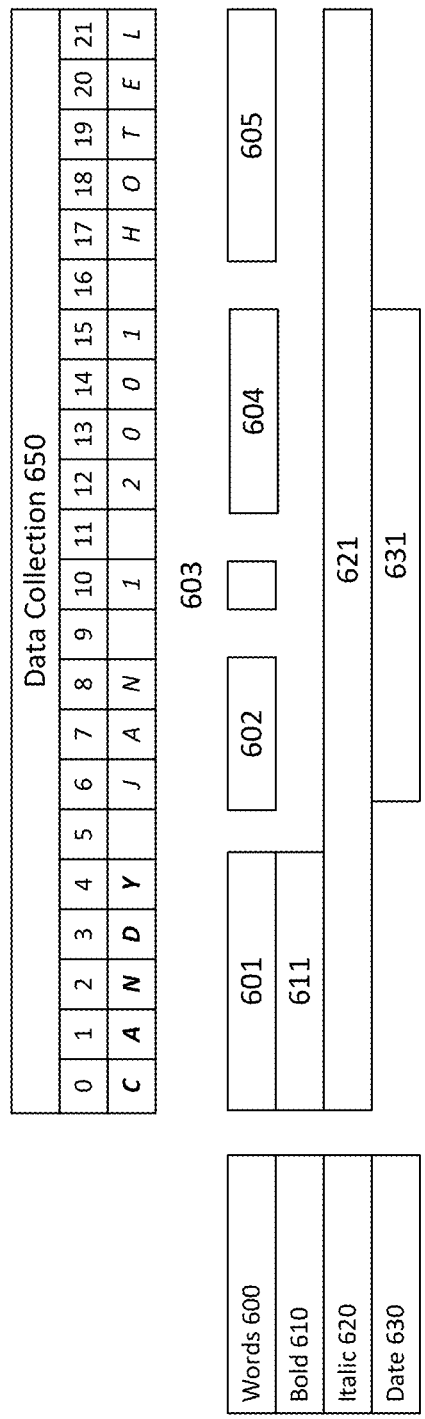
FIG. 6 is diagram illustrating second example multiple information class spans within a data collection that may be used in accordance with the present disclosure.

Referring now to FIG. 6, another example data collection 650 is shown that includes the data "CANDY Jan. 1 2001 HOTEL". As shown in FIG. 6, offsets 0-21 are shown for indicating ranges of various data spans within data collection 650. As also shown in FIG. 6, the data within collection 650 corresponds to a number of information types including words 600, bold 610, italic 620, and date 630. Specifically, words 600 are textual character information types categorized within textual character information class 111. Additionally, bold 610 and italic 620 are visual style information types categorized within visual style information class 112. Furthermore, date 630 is an inferred information type categorized within inferred information class 113. As also shown in FIG. 6, it is seen that the words information type 300 has four associated spans 601-605 within data collection 650. The bold information type 610 has one associated span 611 within data collection 650. The italic information type 620 has one associated span 621 within data collection 650. The date information type 630 has one associated span 631 within data collection 650.

It is noted that the first call to curr(s) for data collection 650 of FIG. 6 will return results identical to the first call to curr(s) for data collection 350 of FIG. 3 (and shown in results box 510 of FIG. 5). This is because both data collection 350 and data collection 650 begin with the bold and italic word CANDY. However, it is noted that the second call to curr(s) for data collection 650 of FIG. 6 will return different results than the second call to curr(s) for data collection 350 of FIG. 3. This is because the remaining portions of data collections 350 and 650 (i.e., subsequent the word CANDY) differ from one another.

Referring now to FIG. 7, it is seen that results box 710 includes example results for a second call to curr(s) for data collection 650 of FIG. 6 including the data "CANDY Jan. 1 2001 HOTEL". The second call to curr(s) may be associated with a start offset of 6, which is the next offset including text subsequent to the end of the word CANDY at offset 4. The second call to curr(s) may, therefore, return a set of current tokens for each information type in data collection 650 that are permitted to start at an offset of 6. Specifically, as shown in box 710, the second call to the curr(s) instruction returns a set of five tokens 700-704. In particular, token 700 is associated with the word information type (i.e., the word JAN), token 701 is associated with the italic information type (i.e., the italic text Jan. 1 2001 HOTEL), token 702 is associated with the word+italic information type (i.e., the italic word JAN), and token 703 is associated with the date information type (i.e., the date Jan. 1 2001), and token 704 is associated with the date+italic information type (i.e., the italic date Jan. 1 2001).

Thus, tokens 700-704 may represent a set of current tokens returned by the second call to the curr(s) instruction. As set forth above, in some examples, the parser may select, for example based on data organization rules 210, a token from set of current tokens (e.g., one of tokens 700-704) and issue an advance(t) call requesting advancement to a next token set corresponding to the selected current token. As also shown in FIG. 7, result boxes 720-724 show example results for an advance(t) call for each of tokens 700-704. As can be seen in FIG. 7, for each of tokens 700 and 702, the respective result boxes 720 and 722 return a next set of tokens for multiple information types starting at offset 10. This is because tokens 700 and 702 end at offset 8, and offset 10 is the next offset including text subsequent to offset 8. Additionally, for each of tokens 703 and 704, the respective result boxes 723 and 724 return a next set of tokens for multiple information types starting at offset 17. This is because tokens 703 and 704 end at offset 15, and offset 17 is the next offset including text subsequent to offset 15. Furthermore, for token 701, the respective result box 721 returns no tokens. This is because token 701 ends at offset 21, which is the end of data collection 650.

Thus, the parsing instructions described above, such as curr(s) and advance(t), may improve efficiency and reduce computation resources required for parsing of a data collection. In particular, as described above, the curr(s) instruction may improve efficiency by, for example, allowing a set of potentially multiple current tokens to be generated for multiple different information classes and/or types. Additionally, the advance(t) instruction allows the parser to select one or more particular tokens from a current token set for advancement to a next token set. This may improve efficiency and reduce computation resources by allowing a next set of tokens to be generated only for the selected current tokens, for example as opposed to generating a next set of tokens for all current tokens (including even those that may be inapplicable or irrelevant in relation to data organization rules 210).

Referring back to FIG. 2, it is shown that parser 211 may provide parsing instructions, such as curr(s) and advance(t), based at least in part on a set of data organization rules 210. For example, rules 210 may assist the parser in selecting one or more tokens from a current set of tokens to consume and use to advance to a next set of tokens, such as by calling advance(t). Referring now to FIG. 8, some example data organization rules 810 will now be described in detail. In the example of FIG. 8, data organization rules 810 include an extended Backus-Naur Form (BNF) related format. While BNF is a common language for defining grammars, it is noted that other languages and/or formats may also be employed. As shown, data organization rules 810 include definition rules 811 that define various example grammatical constructs, such as a stub and a flub. In some examples, a stub and/or a flub may represent various tasks that may trigger one or more actions by a computer program. In the definition rules 811, the [ ] notation is used to reference a particular token in a particular information type and/or class. For example, in the "text" information type, a "word" token can be referenced, and in the "bold" information type, a "span" token can be referenced. The organization of information types and/or classes may be up to the implementer. For example, in some other scenarios, there may be a "style" information type that contains "boldspan", "italicspan", and so forth. In the grammar of data organization rules 810, the notation+is used to indicate that both tokens must be present while parsing in order for a rule to be applied, and that both should be treated as a single token (as a tuple) when added to a parse tree. Data organization rules 810 also include example glue rules 812, which may prevent the language from introducing cycles or encountering a halting problem. For example, the glue rules 812 define a block and also define a sentence, while is included in the definition of a block. As set forth above, in some examples, data organization rules 810 may be implemented by parser 211. Parser 211 may, for example, be capable of considering composite non-terminals in the grammar when applying rules 810. In some examples, after a composite token is accepted, the lexical analyzer 212 may determine a next token by calculating the lowest re-entry range "end" value of the composite token, and returning any tokens which have the next index within its escape range.

Thus, as described above, parser 211 may use data collection rules to parse a data collection and organize the parsed data. In particular, referring again to FIG. 2, it is seen that parser 211 may employ data organization rules 210 and/or 810 to organize the parsed data, such as results of the curr(s) and advance(t) instructions described above, into an instruction set 220 that may be provided to one or more computer programs 230 for execution. For example, in some cases, instruction set 220 may include data organized into an Abstract Syntax Tree (AST), for example based on rules such as those specified in definition rules 811. In some examples, an AST or other information in instruction set 220 may identify grammatical constructs defined by rules 811, such as a stub and a flub, that are included within the data collection 110. Also, in some examples, a computer program 230 may use the instruction set 220 to perform various operations. For example, if the instruction set 220 identifies one or more stubs, then a computer program 230 may perform operations related to stubs, such as displaying various menu items related to stubs. Additionally, if the instruction set 220 identifies one or more flubs, then a computer program 230 may perform operations related to flubs, such as displaying various menu items related to flubs. As another example, if a stub and/or a flub represent various computer program tasks, then an identification of such tasks in instruction set 220 may trigger computer program 230 to provide options such as re-assign, mark complete, duplicate, forward, and others. As another example, if a stub and/or a flub represent various potential problems or errors, then an identification of such problems or errors in instruction set 220 may trigger computer program 230 to provide options such as escalate, send to manager, retry, log, and others.

Figure 9:
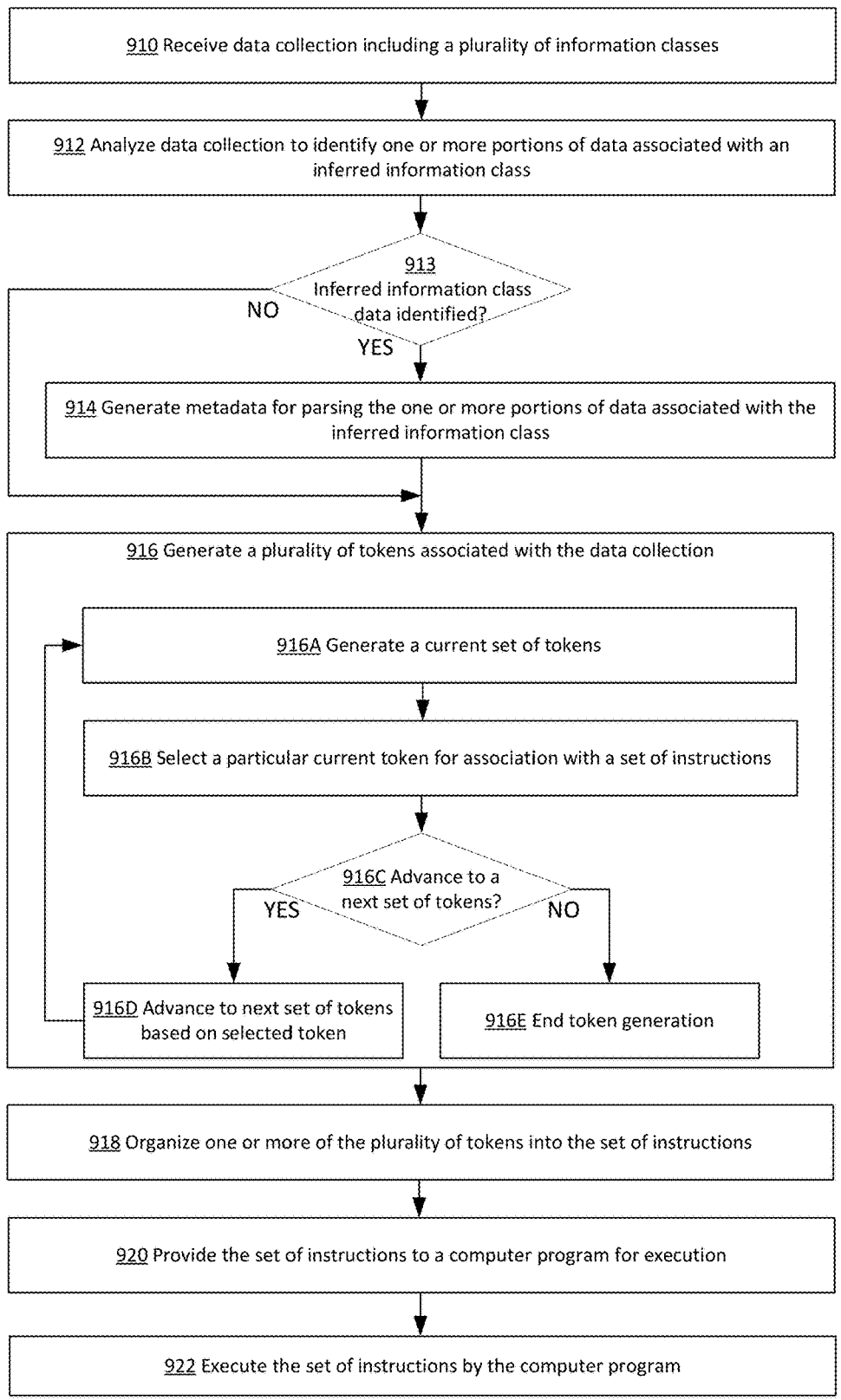
FIG. 9 is a flowchart illustrating an example method for processing a data collection including multiple information classes that may be used in accordance with the present disclosure.

FIG. 9 is a flowchart illustrating an example method for processing a data collection including multiple information classes that may be used in accordance with the present disclosure. As shown, the method of FIG. 9 begins at operation 910, at which a data collection including a plurality of information classes is received. As set forth above, a data collection may include information classes such as a textual character information class, a visual style information class, an inferred information class, and/or other information classes. Each of these information classes is described in detail above and is not repeated here.

At operation 912, the data collection is analyzed to identify one or more portions of data associated with the inferred information class within the data collection. As set forth above, inferred information class data may include data that is identifiable based, at least in part, on information external to the data collection. For example, the inferred information class data may be identified by components such as recognizers 120A-N of FIG. 1, for example based on information obtained from sources 130 of FIG. 1, such as databases, case management applications, customer relationship management (CRM) applications, productivity tools, spreadsheets, web services, and others. As also set forth above, in some examples, the inferred information class may include data identifiable based, at least in part, on one or more machine learning processes. In some examples, the inferred information class may include information types such as date, phone number, web address, email address, street address, spoken language information (e.g., sentence, subject, object, verb, etc.), case number, customer identifier, invoice number, employee identifier, product identifier, product type, business unit, and others.

At operation 913, it is determined whether one or more portions of data associated with the inferred information class are identified within the data collection. If so, then, at operation 914, metadata for parsing the one or more identified portions of data is generated. For example, inferred information metadata 115 of FIG. 1 may be associated with the one or more identified portions of data. As set forth above, the metadata may include information such as an inferred information type (e.g., date, phone number, address, etc.), an indication of the characters included within the data portion, an indication of a position or location of the data portion within the data collection 110 (e.g., one or more offset values), a confidence value that the data portion corresponds to the indicated information type, and other associated information. In one specific example, the metadata may indicate an English language sentence within the data collection as well as elements of the sentence, such as a subject, object, verb, etc.

At operation 916, a plurality of tokens associated with the data collection are generated. As set forth above, the plurality of tokens may be generated based, at least in part, on a set of rules associated with one or more of the plurality of information classes, such as data organization rules 210, 810 described above. For example, a parser may use the data organization rules to provide instructions to a lexical analyzer for generating the plurality of tokens. As set forth above, in some examples, the data organization rules may include rules that define one or more valid combinations of tokens, such as valid combinations of tokens from different information classes and/or types. As set forth above, a "token", as used herein, may refer to a portion of data that is identifiable based on one or more criteria. Thus, in some examples, generating a plurality of tokens may include identifying a plurality of data portions, for example based on criteria such as the information types and information classes described above.

In some examples, operation 916 may include sub-operations 916A-E. In particular, at sub-operation 916A, a current set of one or more tokens may be generated. The current set of tokens may be associated with a particular portion of the data collection. For example, at the first iteration of sub-operation 916A, the current set of tokens may be associated with a start of the data collection, such as by starting at an offset of zero. In some examples, the current set of tokens may be generated in response to issuance of a curr(s) instruction such as described above. In some examples, the current set of tokens may include multiple tokens, such as when multiple information classes and/or types are associated with a particular portion of the data collection for which the current set of tokens is generated. Also, in some examples, the current set of tokens may be generated based on escape ranges and re-entry ranges for various portions of data, for example such as shown in FIG. 4 and described above.

At sub-operation 916B, a particular token is selected for association with a set of instructions. For example, if the data organization rules indicate that selection of a particular token for a particular information class may be valid, then the parser may select that particular token for association with the set of instructions. As a specific example, definition rules 811 indicate that a stub may start with a [text]word+ bold[span] tuple token. Thus, for an initial set of current tokens, a parser may, for example, select a [text]word+bold [span] tuple token at sub-operation 916B in order to generate a stub. As another example, definition rules 811 indicate that a stub may include a [date]date token following a [text] word+bold[span] tuple token. Thus, for a second iteration of sub-operation 916B, the parser may, for example, select a [date]date token to generate a stub. Definition rules 811 further indicate that a stub may include a [text]word token following a [date]date token. Thus, for a third iteration of sub-operation 916B, the parser may, for example, select a [text]word token to generate a stub.

At sub-operation 916C, it is determined whether to advance to a next set of tokens. In some cases, it may not be permissible to advance to a next set of tokens, such as when the token selected at sub-operation 916B ends at the end of the data collection (and no subsequent tokens remain). Also, in some examples, the parser may determine not to advance to a next set of tokens if no additional valid token combinations are specified by the set of data organization rules. If it is determined not to advance to a next set of tokens, then the token generation may end at sub-operation 916E. By contrast, if it is determined to advance to a next set of tokens, such as when there are remaining potentially valid tokens, the method may proceed to sub-operation 916D.

At sub-operation 916D, a next set of tokens is advanced to based, at least in part, on the selected token. In particular, the next set of tokens may be generated based, at least in part, on the selected token. For example, in some cases, the lexical analyzer may identify an end offset value of the token selected at sub-operation 916B. The lexical analyzer may then determine a next offset value including text subsequent to the end offset value of the selected token. This determined offset value may then be used as the offset start value for the next set of tokens, thereby identifying a portion of the data collection with which the next set of tokens are associated. For example, as shown in FIG. 5, tokens 500, 501, 503, 504 and 505 each have an end offset value of 4. FIG. 5 also shows the results boxes 520, 521, 523, 524, and 525 for advancing to a next set of tokens for each of tokens 500, 501, 503, 504 and 505. The next set of tokens in result boxes 520, 521, 523, 524, and 525 all start at an offset of 6, which is the next offset to include text subsequent to the end of tokens 500, 501, 503, 504 and 505 at offset 4. In some examples, the next set of tokens may be advanced to in response to issuance of an advance(t) instruction such as described above. Upon advancement to the next set of tokens, a current token set may then be generated for the next set of tokens by returning to sub-operation 916A for a next iteration of sub-operation 916A. It is noted that, in some examples, the parser may select more than one token at sub-operation 916B for association with the set of instructions. In this scenario, the lexical analyzer may, for example, generate multiple next sets of tokens based on each of the tokens selected at sub-operation 916B.

At operation 918, one or more of the generated plurality of tokens are organized into a set of instructions. Operation 918 may also be performed based, at least in part, on a set of rules associated with one or more of the plurality of information classes, such as data organization rules 210, 810 described above. For example, in some cases, the parser may organize the generated tokens by compiling one or more selected tokens into a construct defined in the data organization rules. In particular, in the example of FIG. 8, the parser may generate a stub by, for example, combining a [text]word+bold[span] tuple token with a [date]date token and a [text]word token in the order indicated by definition rules 811. As also set forth above, in some cases, the instruction set may include data organized into an Abstract Syntax Tree (AST), for example based on rules such as those specified in definition rules 811.

At operation 920, the instruction set is provided to a computer program for execution by the computer program, and, at operation 922, the instruction set is executed by the computer program. As set forth above, in some examples, an AST or other information in instruction set may identify grammatical constructs defined by rules 811, such as a stub and a flub. Also, in some examples, a computer program may use the instruction set to perform various operations. For example, if the instruction set identifies one or more stubs, then a computer program may perform operations related to stubs, such as displaying various menu items related to stubs. Additionally, if the instruction set identifies one or more flubs, then a computer program may perform operations related to flubs, such as displaying various menu items related to flubs. As another example, if a stub and/or a flub represent various computer program tasks, then an identification of such tasks in the instruction set may trigger the computer program to provide options such as re-assign, mark complete, duplicate, forward, and others. As another example, if a stub and/or a flub represent various potential problems or errors, then an identification of such problems or errors in the instruction set may trigger the computer program to provide options such as escalate, send to manager, retry, log, and others.

Figure 10:
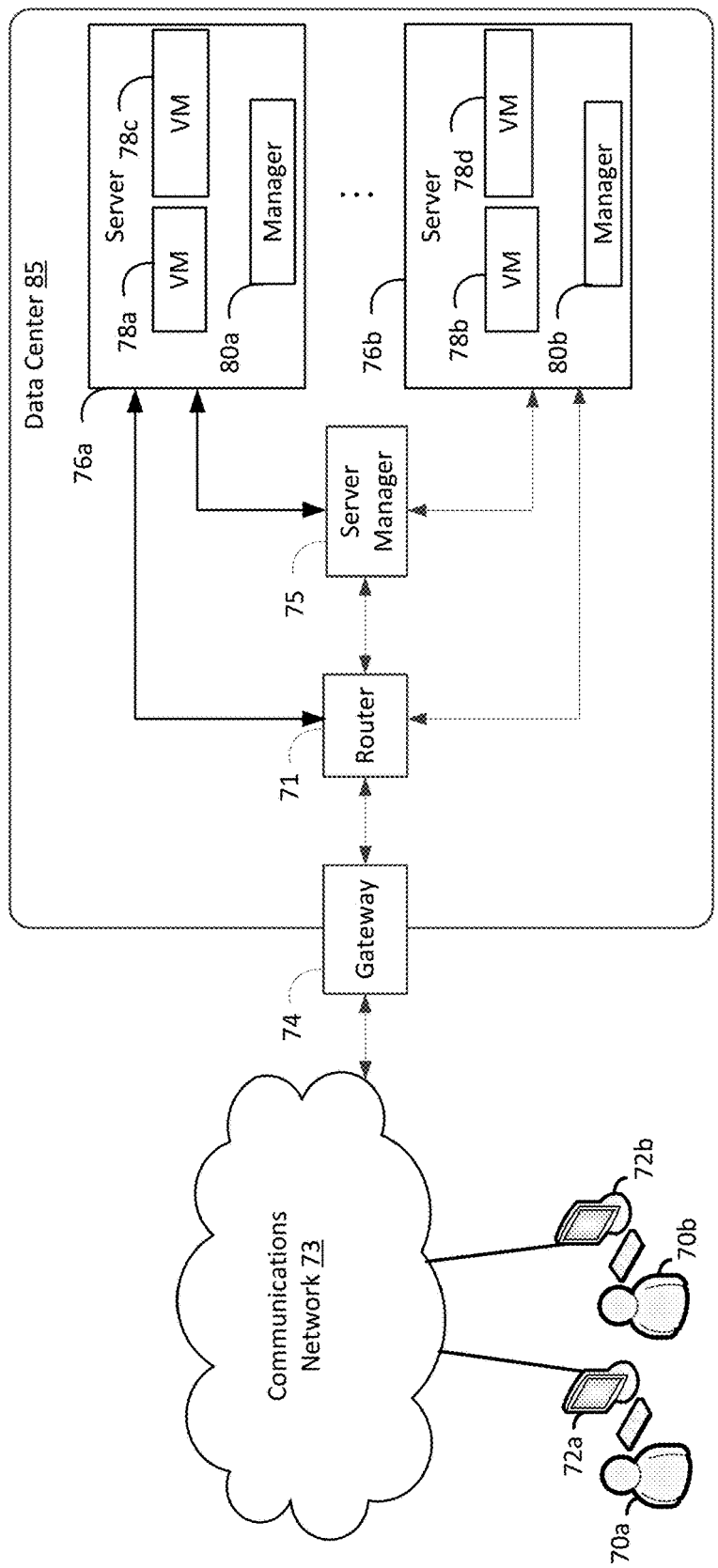
FIG. 10 is a diagram illustrating an example system for transmitting and providing data that may be used in accordance with the present disclosure.

An example system for transmitting and providing data will now be described in detail. In particular, FIG. 10 illustrates an example computing environment in which the embodiments described herein may be implemented. FIG. 10 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 10, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 10 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 10, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 10, a server manager 75 is also employed to at least in part direct various communications to, from and/or between servers 76a and 76b. While FIG. 10 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 10 has been greatly simplified and that many more networks and networking devices may be utilized to interconnect the various computing systems disclosed herein. These network topologies and devices should be apparent to those skilled in the art.

It should also be appreciated that data center 85 described in FIG. 10 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 11:
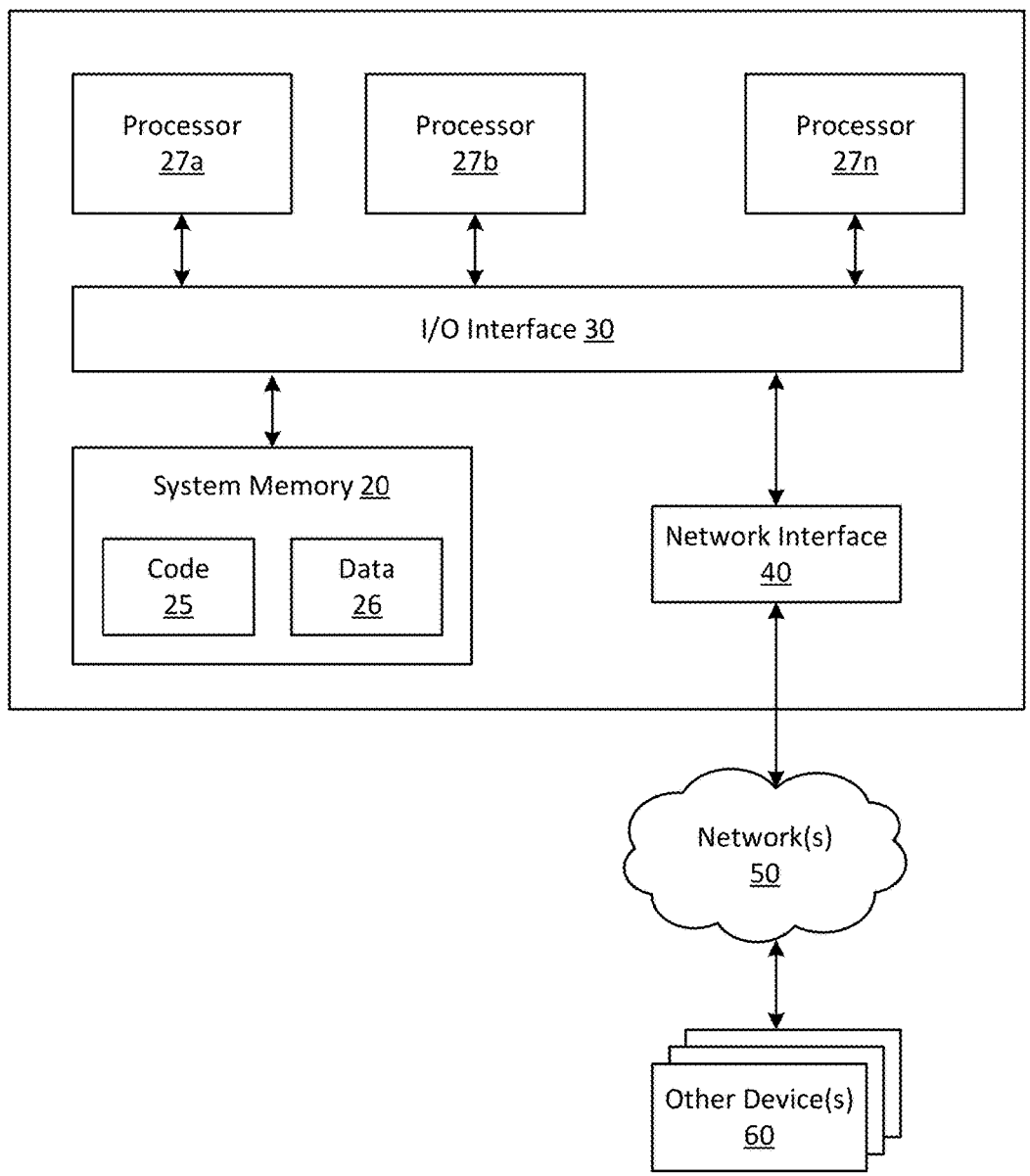
FIG. 11 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 11 depicts a computer system that includes or is configured to access one or more computer-accessible media. In the illustrated embodiment, computing device 28 includes one or more processors 27a, 27b and/or 27n (which may be referred herein singularly as "a processor 27" or in the plural as "the processors 27") coupled to a system memory 20 via an input/output (I/O) interface 30. Computing device 28 further includes a network interface 40 coupled to I/O interface 30.

In various embodiments, computing device 28 may be a uniprocessor system including one processor 27 or a multiprocessor system including several processors 27 (e.g., two, four, eight or another suitable number). Processors 27 may be any suitable processors capable of executing instructions. For example, in various embodiments, processors 27 may be embedded processors implementing any of a variety of instruction set architectures (ISAs), such as the x86, PowerPC, SPARC or MIPS ISAs or any other suitable ISA. In multiprocessor systems, each of processors 27 may commonly, but not necessarily, implement the same ISA.

System memory 20 may be configured to store instructions and data accessible by processor(s) 27. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 27, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 27). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 27.

Network interface 40 may be configured to allow data to be exchanged between computing device 28 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 28 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system for processing a data collection comprising:
   one or more processors; and
   one or more memories having stored therein instructions that, upon execution by the one or more processors, cause the computing system perform operations comprising:
   receiving the data collection including a first information class comprising a plurality of visual styles;
   generating a plurality of tokens based at least in part on the first information class that comprises the plurality of visual styles, the plurality of tokens comprising a first token starting at a first offset of the data collection and having a first visual style of the plurality of visual styles and a second token also starting at the first offset of the data collection and having a second visual style of the plurality of visual styles;
   organizing, based at least in part on a set of rules associated with the first information class, one or more of the plurality of tokens into a set of instructions; and
   providing, to a computer program, the set of instructions for execution by the computer program.

2. The computing system of claim 1, wherein the first information class comprises at least one information type including at least one of color, bold, italics, underlining, or font size.

3. The computing system of claim 1, wherein the data collection also includes a second information class that comprises data identifiable based, at least in part, on information external to the data collection, and wherein the second information class comprises at least one information type including at least one of a date, a phone number, or an address.

4. The computing system of claim 1, wherein the generating comprises:
  generating a first set of tokens associated with a first portion of the data collection;
  selecting, based at least in part on the set of rules, a selected token from the first set of tokens for association with the set of instructions; and
  generating, based at least in part on the selected token, a next set of tokens.

5. A computer-implemented method for processing a data collection comprising:
  receiving the data collection including a first information class comprising a plurality of visual styles;
  generating a plurality of tokens based at least in part on the first information class that comprises the plurality of visual styles, the plurality of tokens comprising a first token starting at a first offset of the data collection and having a first visual style of the plurality of visual styles and a second token also starting at the first offset of the data collection and having a second visual style of the plurality of visual styles;
  organizing, based at least in part on a set of rules associated with the first information class, one or more of the plurality of tokens into a set of instructions; and
  providing, to a computer program, the set of instructions for execution by the computer program.

6. The computer-implemented method of claim 5, wherein the data collection also includes a second information class that comprises data identifiable based, at least in part, on information external to the data collection.

7. The computer-implemented method of claim 6, wherein the second information class comprises at least one information type including at least one of a date, a phone number, or an address.

8. The computer-implemented method of claim 6, wherein the second information class comprises data identifiable based, at least in part, on a machine learning process.

9. The computer-implemented method of claim 6, further comprising:
  identifying, within the data collection, one or more portions of data included in the second information class; and
  generating metadata associated with the one or more portions of data for parsing of the one or more portions of data.

10. The computer-implemented method of claim 5, wherein the first information class comprises at least one information type including at least one of color, bold, italics, underlining, or font size.

11. The computer-implemented method of claim 5, wherein the generating comprises:
  generating a first set of tokens associated with a first portion of the data collection;
  selecting, based at least in part on the set of rules, a selected token from the first set of tokens for association with the set of instructions; and
  generating, based at least in part on the selected token, a next set of tokens.

12. The computer-implemented method of claim 5, wherein one or more of the plurality of tokens is generated based, at least in part, on a first range of one or more offsets that permissibly lead into a token and a second range of one or more offsets that a token permissibly exits into.

13. The computer-implemented method of claim 5, wherein the set of rules defines one or more valid combinations of tokens from different information classes.

14. One or more non-transitory computer-readable storage media having stored thereon instructions that, upon execution by one or more computing devices, cause the one or more computing devices to perform operations comprising:
  receiving a data collection including a first information class comprising a plurality of visual styles;
  identifying a plurality of data portions based at least in part on the first information class that comprises the plurality of visual styles, the plurality of data portions comprising a first data portion starting at a first offset of the data collection and having a first visual style of the plurality of visual styles and a second data portion also starting at the first offset of the data collection and having a second visual style of the plurality of visual styles;
  organizing, based at least in part on a set of rules the first information class, one or more of the plurality of data portions into a set of instructions; and
  providing, to a computer program, the set of instructions for execution by the computer program.

15. The one or more non-transitory computer-readable storage media of claim 14, wherein the first information class comprises at least one information type including at least one of color, bold, italics, underlining, or font size.

16. The one or more non-transitory computer-readable storage media of claim 14, wherein the data collection also includes a second information class that comprises data identifiable based, at least in part, on information external to the data collection.

17. The one or more non-transitory computer-readable storage media of claim 16, further comprising:
  identifying, within the data collection, one or more portions of data included in the second information class; and
  generating metadata associated with the one or more portions of data for parsing of the one or more portions of data.

18. The one or more non-transitory computer-readable storage media of claim 14, wherein the identifying comprises:
  generating a first set of data portions;
  selecting, based at least in part on the set of rules, a selected data portion from the first set of data portions for association with the set of instructions; and
  generating, based at least in part on the selected data portion, a next set of data portions.

19. The one or more non-transitory computer-readable storage media of claim 14, wherein one or more of the plurality of data portions is identified based, at least in part, on a first range of one or more offsets that permissibly lead into a data portion and a second range of one or more offsets that a data portion permissibly exits into.

20. The one or more non-transitory computer-readable storage media of claim 14, wherein the set of rules defines one or more valid combinations of data portions from different information classes.

* * * * *